United States Patent
Nakazawa

(10) Patent No.: US 9,887,441 B2
(45) Date of Patent: Feb. 6, 2018

(54) SECONDARY CELL

(71) Applicant: Guala Technology Co., Ltd., Kobe (JP)

(72) Inventor: Akira Nakazawa, Kobe (JP)

(73) Assignee: Guala Technology Co., Ltd., Kobe (JP)

( * ) Notice: Subject to any disclaimer, the term of this patent is extended or adjusted under 35 U.S.C. 154(b) by 256 days.

(21) Appl. No.: 13/856,029

(22) Filed: Apr. 3, 2013

(65) Prior Publication Data

US 2013/0224596 A1    Aug. 29, 2013

Related U.S. Application Data

(63) Continuation of application No. PCT/JP2010/067643, filed on Oct. 7, 2010.

(51) Int. Cl.
| | |
|---|---|
| *H01M 14/00* | (2006.01) |
| *H01M 10/02* | (2006.01) |
| *H01M 10/00* | (2006.01) |
| *H01M 4/131* | (2010.01) |

(52) U.S. Cl.
CPC ......... *H01M 14/005* (2013.01); *H01M 4/131* (2013.01); *H01M 10/00* (2013.01); *H01M 10/02* (2013.01); *H01M 14/00* (2013.01)

(58) Field of Classification Search
CPC ........... H01L 31/022425; H01L 49/006; H01L 31/053; Y02E 10/50; H01G 9/2031; H01G 9/2036; H01M 10/00; H01M 10/02; H01M 14/00; H01M 14/005
USPC ........................................ 136/252, 255, 256
See application file for complete search history.

(56) References Cited

U.S. PATENT DOCUMENTS

| | | | | |
|---|---|---|---|---|
| 4,888,062 | A  * | 12/1989 | Nakagawa et al. | ........... 136/258 |
| 5,913,986 | A | 6/1999 | Matsuyama | |
| 2003/0140963 | A1* | 7/2003 | Yamanaka et al. | ........... 136/263 |
| 2007/0137693 | A1* | 6/2007 | Forrest | ........................ 136/255 |

(Continued)

FOREIGN PATENT DOCUMENTS

JP         2001167808 A   *   6/2001

OTHER PUBLICATIONS

English machine translation of JP2001-167808A.*

(Continued)

*Primary Examiner* — Lindsey Bernier
(74) *Attorney, Agent, or Firm* — Oliff PLC

(57) ABSTRACT

A secondary cell is provided that enables cost reduction and stable operation with a simple configuration and greatly exceeds the capacity of a lithium-ion cell. In a secondary cell, a conductive first electrode is formed on a substrate. An n-type metal oxide semiconductor layer, a charging layer for charging energy, a p-type metal oxide semiconductor layer, and a second electrode are laminated. The charging layer is filled with an n-type metal oxide semiconductor of fine particles. By a photoexcited structural change phenomenon caused by ultraviolet irradiation, a new energy level is formed in a band gap of the n-type metal oxide semiconductor. An electron is captured at the newly formed energy level, thereby charging energy. The charging layer is charged by connecting a power source between the first electrode and the second electrode. It is also possible to charge energy by light, using a transparent electrode.

20 Claims, 11 Drawing Sheets

(56) References Cited

U.S. PATENT DOCUMENTS

2013/0276878 A1* 10/2013 Nakazawa .................... 136/256
2014/0352775 A1* 12/2014 Kudoh et al. ................. 136/256

OTHER PUBLICATIONS

Palomares et al. "Control of charge recombination dynamics in dye sensitized solar cells by the use of conformally deposited metal oxide blocking layers". J. Am. Chem. Soc. 2003. 125, 475-482.*
U.S. Appl. No. 13/854,165, filed Apr. 1, 2013, Nakazawa, Akira.
U.S. Appl. No. 14/355,509, filed Aug. 4, 2014, Kudoh, Takuo et al.

* cited by examiner

SECONDARY CELL

CROSS REFERENCE TO RELATED APPLICATION

This application is a continuation of International application No. PCT/JP2010/067643, filed on Oct. 7, 2010, the contents of which are incorporated herein by reference.

BACKGROUND OF THE INVENTION

Field of the Invention

The present invention relates to a secondary cell of an inorganic solid excellent in safety and environmental resistance, based on an operation principle of forming a new energy level in a band gap utilizing photoexcited structural change of a metal oxide caused by ultraviolet irradiation and capturing an electron.

Description of the Related Art

Amid growing awareness of global environmental problems such as exhaustion of fossil fuels and warming associated with increases in carbon dioxide, attention is being given to solar cells as clean energy sources and secondary cells for storing energy.

In particular, automobiles are powered by fossil fuel, emitting hazardous substances such as carbon dioxide; therefore, reductions in fuel consumption and exhaust gas are an important issue. Accordingly, HEV (Hybrid Electric Vehicle) which is also driven by an electric motor and EV (Electric Vehicle) which is fully electrified are expected to become mainstream.

Further, the latest mobile devices have become remarkably widespread, and the charge power source capacity is expected to increase.

In the current HEV, EV, or mobile devices, a nickel-hydrogen secondary cell is commonly used as a secondary cell. Recently, a lithium-ion cell has been developed as a secondary cell capable of higher output and larger capacity, and is in the initial stage of practical use.

In the lithium-ion cell, a metal double oxide containing lithium is used as a positive electrode and a material such as carbon that can accept and release lithium is used as a negative electrode, which are impregnated with an electrolytic solution containing a lithium salt capable of ionic dissociation and an organic solvent capable of dissolving it. Carbon electrodes of graphite powder improved for higher performance and larger capacity are disclosed (e.g., see Japanese Patent Application Laid-Open No. 2002-124256 (Patent Document 1), Japanese Patent Application Laid-Open No. 2002-141062 (Patent Document 2), etc.). Further, there is also a case where fibrous carbonaceous matter as a conducting agent is contained in a sheet-shaped negative electrode and thermoplastic resin is used as a binding agent, thereby providing the sheet-shaped negative electrode for a high-performance lithium-ion secondary cell at low cost (see Japanese Patent Application Laid-Open No. 2009-146581 (Patent Document 3) etc.)

In the case of using a transition heavy metal oxide as the active material of the positive electrode of the lithium-ion cell, the high specific gravity of the element theoretically makes it difficult to produce a large-capacity cell. For this reason, there is disclosed a high energy density, large-capacity, and high-stability cell utilizing a radical compound as the active material of an energy storage device such as the cell by stabilizing the radical compound produced by a radical reaction in the course of at least one of charging and discharging as electrochemical oxidation-reduction reaction (see Japanese Patent Application Laid-Open No. 2002-170568 (Patent Document 4) etc.)

Further, there is disclosed an all-solid lithium secondary cell using a solid electrolyte in place of an electrolytic solution because there is a possibility of liquid leakage due to the electrolytic solution being liquid and it is necessary to enhance the safety of the cell in improper use due to the use of a combustible (see Japanese Patent Application Laid-Open No. 2007-5279 (Patent Document 5) etc.)

The lithium-ion cell is expected to be a secondary cell of high performance and large capacity, in comparison with the conventional nickel-hydrogen secondary cell. However, at present, for example, the travel distance of EV is about 100 km, and it is necessary to further increase the capacity of the secondary cell. Further, the cost of the secondary cell is about half that of EV, and is also required to be lowered.

SUMMARY OF THE INVENTION

It is an object of the present invention to provide a technology for enabling cost reduction and stable operation with a simple configuration and greatly exceeding the capacity of a lithium-ion cell.

According to an aspect of the present invention, to achieve a large-capacity secondary cell with a simple configuration, a substrate, a conductive first electrode, a charging layer for forming an energy level in a band gap by photoexcited structural change of an n-type metal oxide semiconductor coated by an insulating substance and capturing an electron, a p-type semiconductor layer, and a conductive second electrode are laminated. The charging layer is charged by connecting a power source between the first electrode and the second electrode.

By providing a layer of an n-type metal oxide semiconductor between the first electrode and the charging layer in the configuration of the secondary cell, more stable operation can be performed. The first electrode and the second electrode are composed of metal electrodes. The substrate may be made of a conductive material and double as the first electrode.

As for materials, the n-type metal oxide semiconductor provided between the first electrode and the charging layer is titanium dioxide, and the p-type semiconductor is nickel oxide or copper aluminum oxide. The n-type metal oxide semiconductor in the charging layer is one of tin oxide, titanium dioxide, and zinc oxide or a composite thereof, and the insulating substance coating the n-type metal oxide semiconductor is insulating resin or an inorganic insulator.

As for a production method, the charging layer is produced by a production process including a step of dissolving an organic metal salt obtained by binding organic matter to an element of the n-type metal oxide semiconductor and an insulator in an organic solvent and applying it on the first electrode provided on the substrate or on the layer of the n-type metal oxide semiconductor provided on the first electrode, a step of drying and firing after application, and a step of irradiating a layer of the metal salt of the n-type metal oxide semiconductor coated by the insulating substance with ultraviolet light for photoexcited structural change after the firing.

The substrate can be formed of a resin sheet with flexibility for better usability.

An asperity shape on a surface of the first electrode can improve the adhesion of the surface to the laminated layer of the n-type metal oxide semiconductor and the charging layer, and also improve the charge/discharge capacity and charge/discharge rate of the secondary cell. Further, in the case of charging energy into the charging layer by light irradiation through the transparent electrode, the asperity shape increases the surface area, thus making it possible to absorb light energy more efficiently.

DETAILED DESCRIPTION OF THE PREFERRED EMBODIMENTS

The present invention is directed to a secondary cell based on a new charging principle of adopting a photoexcited structural change technology in a charging layer.

The photoexcited structural change refers to the phenomenon of changing the interatomic distance of a substance excited by light irradiation. An n-type metal oxide semiconductor which is an amorphous metal oxide such as tin oxide has the property of causing the photoexcited structural change. By the photoexcited structural change phenomenon, a new energy level is formed in a band gap of the n-type metal oxide semiconductor.

Figure 1:
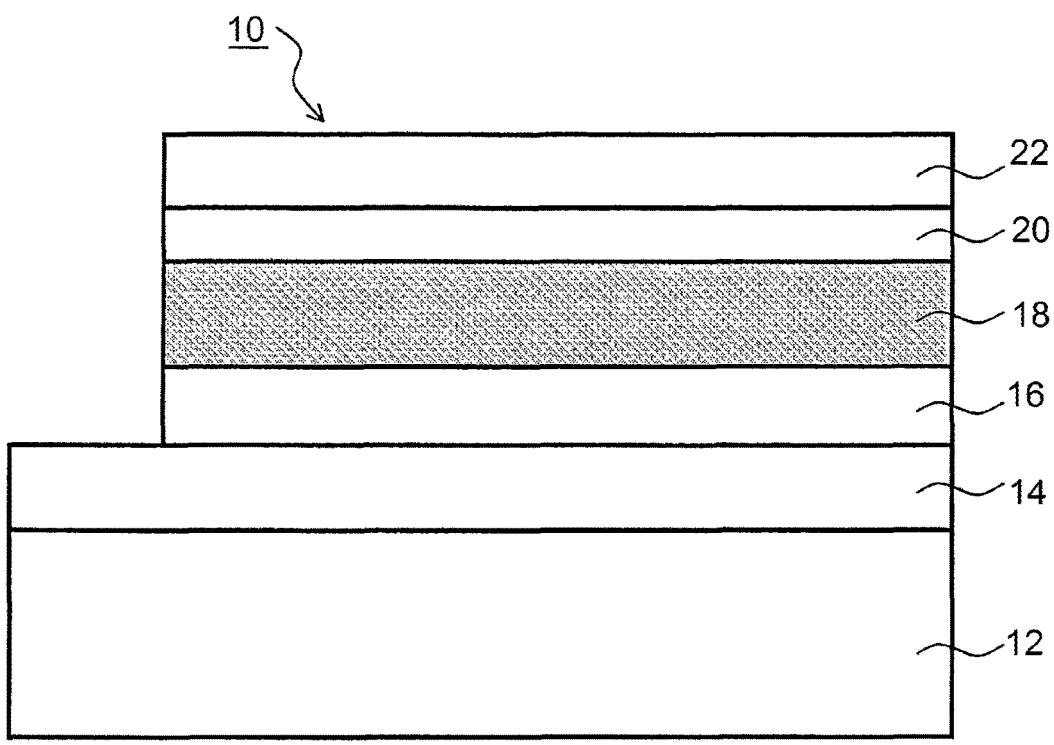
FIG. 1 is a diagram showing the configuration of a secondary cell according to the present invention.

FIG. 1 is a diagram showing the cross section structure of a secondary cell according to the invention. In FIG. 1, in a secondary cell 10, a conductive first electrode 14 is formed on a substrate 12. Further, an n-type metal oxide semiconductor layer 16, a charging layer 18 for charging energy, a p-type metal oxide semiconductor layer 20, and a second electrode 22 are laminated.

The substrate 12 may be an insulating substance or a conducting substance. For example, a glass substrate, a resin sheet of a polymer film, or a metal foil sheet can be used.

The first electrode 14 and the second electrode 22 can be formed of a conductive film. For example, a silver (Ag) alloy film including aluminum (Al) can be used as a metal electrode. Its formation method includes vapor deposition such as sputtering, ion plating, electron beam deposition, vacuum deposition, and chemical vapor deposition. The metal electrode can be formed by electroplating, electroless plating, or the like. In general, copper, copper alloy, nickel, aluminum, silver, gold, zinc, tin, or the like can be used as metal used for plating.

Further, a conductive film of tin-doped indium oxide (Indium Tin Oxide (ITO)) can be used as a transparent conductive electrode.

Titanium dioxide ($TiO_2$), tin oxide ($SnO_2$), or zinc oxide (ZnO) is used as a material for the n-type metal oxide semiconductor layer 16.

The charging layer 18 is filled with an n-type metal oxide semiconductor of fine particles coated by an insulating coat and is a layer having a charging function by photoexcited structural change caused by ultraviolet irradiation. The n-type metal oxide semiconductor is coated by a silicone insulating coat. Titanium dioxide, tin oxide, and zinc oxide are suitable for the n-type metal oxide semiconductor material that can be used in the charging layer 18. A combination of any two or all three of titanium dioxide, tin oxide, and zinc oxide may be used as the material.

The p-type metal oxide semiconductor formed on the charging layer 18 is provided to prevent electron injection from the upper second electrode 22. Nickel oxide (NiO), copper aluminum oxide ($CuAlO_2$), or the like can be used as a material for the p-type metal oxide semiconductor layer 20.

Next, an example of actual trial production will be described.

Glass was used as the substrate 12. A conductive film of tin-doped indium oxide (Indium Tin Oxide (ITO)) as the first electrode 14 was formed on the glass substrate 12, and titanium dioxide ($TiO_2$) as the n-type metal oxide semiconductor layer 16 was formed on the ITO, by sputtering. The p-type metal semiconductor layer 20 was formed of nickel oxide by sputtering, and the second electrode 22 was formed of ITO, like the first electrode 14.

The structure and production method of the charging layer 18 will be described in detail below.

Figure 2:
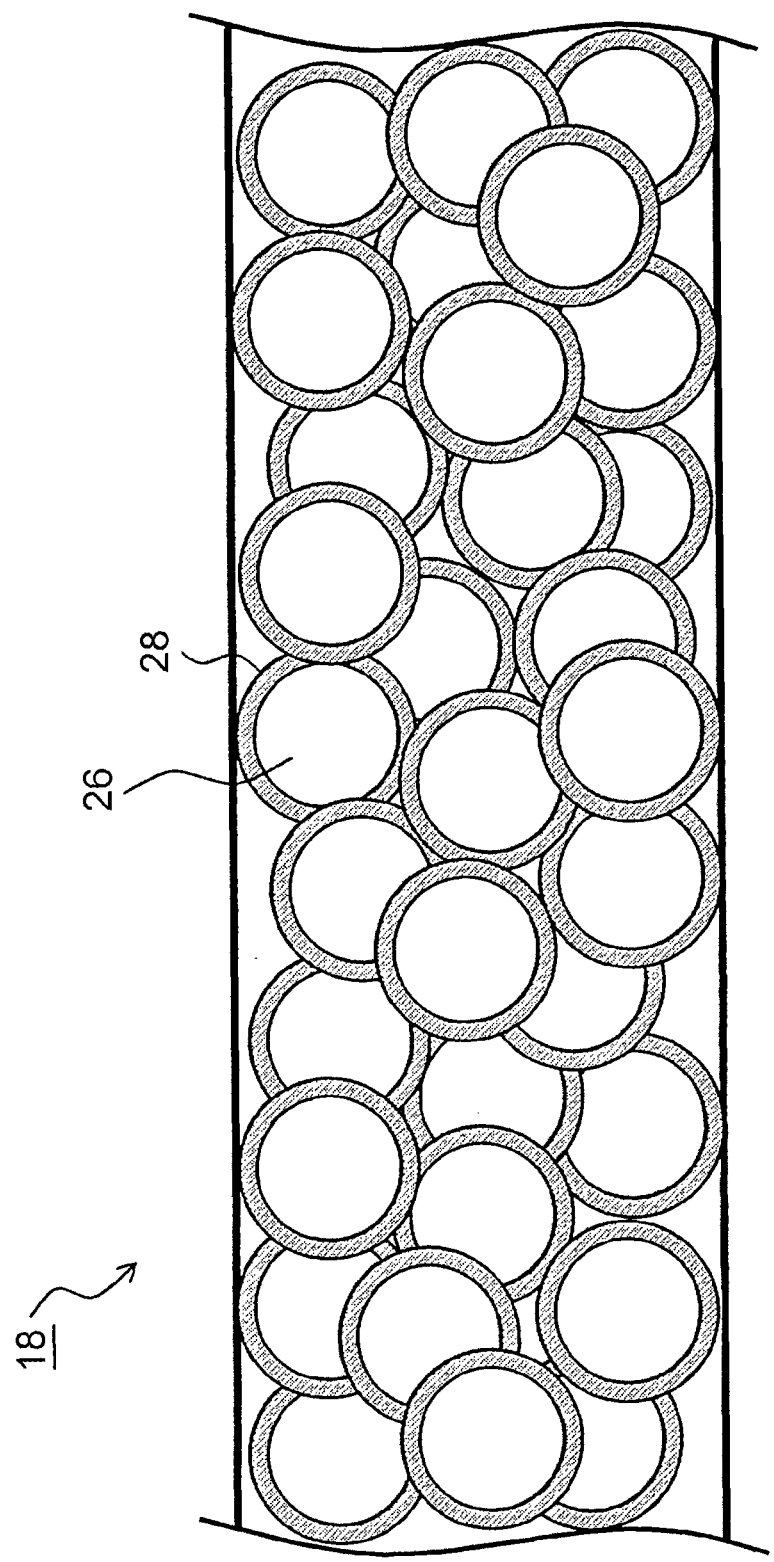
FIG. 2 is a diagram for explaining a charging layer of the secondary cell according to the invention.

FIG. 2 is a diagram for explaining in detail the structure of the charging layer 18 in FIG. 1. In the charging layer 18, silicone is used as an insulating coat 28, and titanium dioxide is used as an n-type metal oxide semiconductor 26, so that the charging layer 18 is filled with titanium dioxide coated by silicone. The charging layer 18 has the function of storing energy by photoexcited structural change caused by irradiating titanium dioxide with ultraviolet light.

A material for the n-type metal oxide semiconductor 26 used in the charging layer 18 is titanium dioxide, tin oxide, or zinc oxide, and is produced by decomposing a metal aliphatic acid salt in a production process. Accordingly, a material that can decompose or burn by ultraviolet irradiation or firing under an oxidizing atmosphere into a metal oxide is used as the metal aliphatic acid salt. Aliphatic polycarboxylic acid such as aliphatic monocarboxylic acid, aliphatic dicarboxylic acid, aliphatic tricarboxylic acid, or aliphatic tetracarboxylic acid can be used as aliphatic acid.

More specifically, saturated aliphatic monocarboxylic acid includes formic acid, acetic acid, propionic acid, caproic acid, enanthic acid, caprylic acid, pelargonic acid, capric acid, and stearic acid. Polyunsaturated monocarboxylic acid such as acrylic acid, butenoic acid, crotonic acid, isocrotonic acid, linolenic acid, and oleic acid can be used as unsaturated aliphatic monocarboxylic acid.

Further, it is preferable that the aliphatic acid salt be the salt of aliphatic acid and metal due to ease of decomposition or burning by heating, high solvent solubility, denseness of a film after decomposition or burning, ease of handling, low cost, ease of synthesis of salt of metal, and the like.

The insulating coat 28 may be, besides silicone, mineral oil, magnesium oxide (MgO), silicon dioxide ($SiO_2$), or the like as an inorganic insulator, or the insulating coat 28 may be, as insulating resin, thermoplastic resin such as polyethylene, polypropylene, polystyrene, polybutadiene, polyvinyl chloride, polymethyl methacrylate, polyamide, polycarbonate, polyimide, or cellulose acetate, or thermosetting resin such as phenolic resin, amino resin, unsaturated polyester resin, allyl resin, alkyd resin, epoxy resin, or polyurethane.

Figure 3:
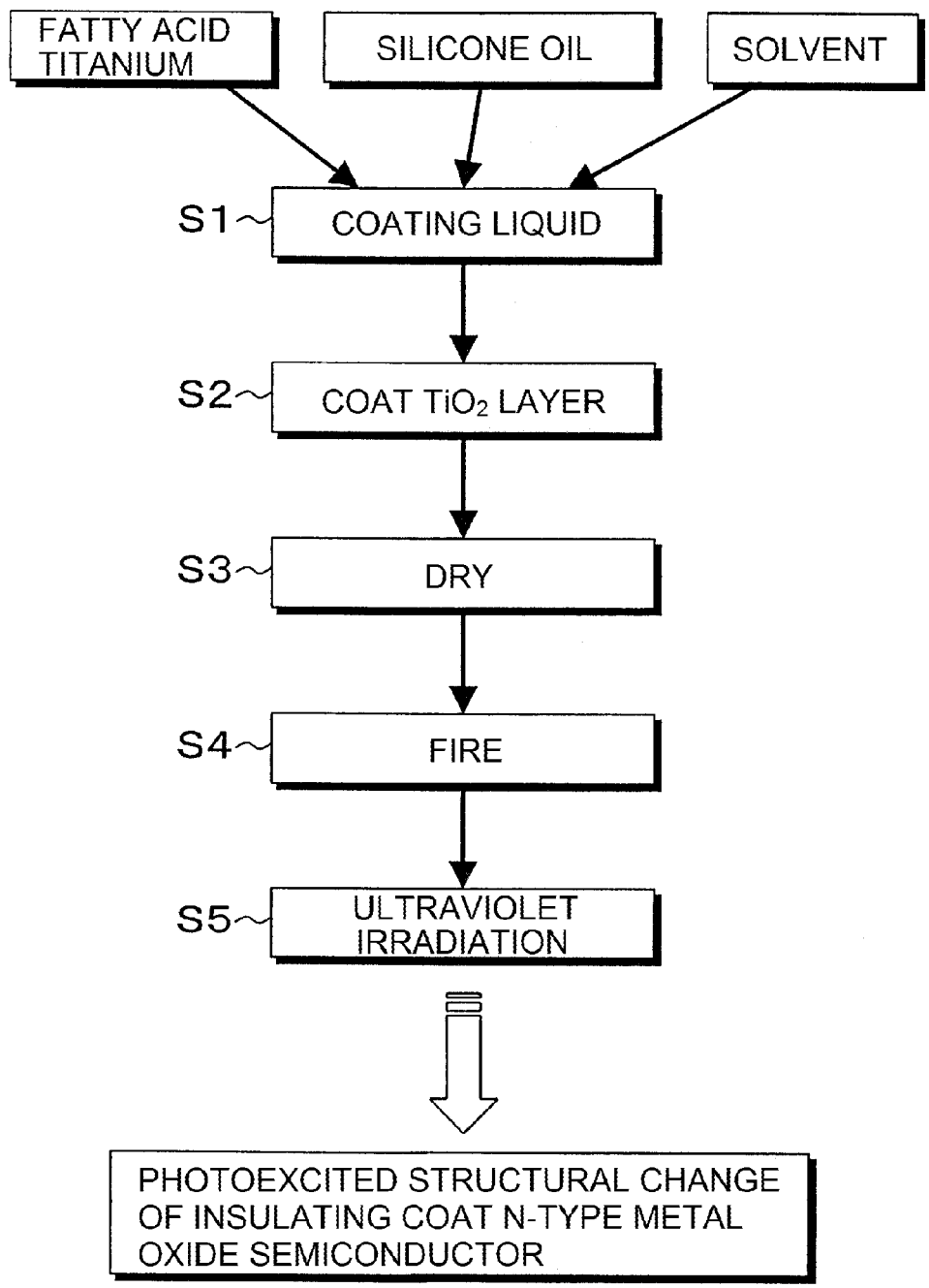
FIG. 3 is a diagram for explaining a production process of the charging layer subjected to photoexcited structural change.

FIG. 3 is a diagram for explaining the process of the production method of the charging layer 18.

First, a substrate in which layers of ITO and titanium dioxide are formed on the glass substrate 12 by sputtering is prepared. Then, by mixing and stirring fatty acid titanium and silicone oil in a solvent, coating liquid is made (S1). Then, a spinner spin-coats the layer of titanium dioxide with the coating liquid while rotating the prepared substrate (S2). A thin layer of 0.3 to 1 μm is formed by rotating the substrate. Specifically, this layer can be considered to have a structure in which the metal salt of titanium dioxide coated by silicone is embedded in a silicone layer without a void part.

Then, it is dried for about 10 minutes at an ambient temperature of 50° C. (S3), and then fired (S4). The firing temperature is 300 to 400° C., and the firing time is 10 minutes to 1 hour. This decomposes the aliphatic acid salt and forms a fine particle layer of titanium dioxide coated by a silicone insulating coat.

The above-described production method of forming the layer of titanium dioxide coated by the silicone insulating coat is called a coating thermal decomposition method.

The next production step is an ultraviolet irradiation step (S5). Ultraviolet irradiation is performed for about 40 minutes at a wavelength of 254 nm and an intensity of 20 $mW/cm^2$. The ultraviolet irradiation changes the interatomic distance of titanium dioxide in the charging layer to cause a photoexcited structural change phenomenon. As a result, a new energy level is formed in a band gap of titanium dioxide. By capturing an electron at the new energy level, energy can be charged.

Figure 4A:
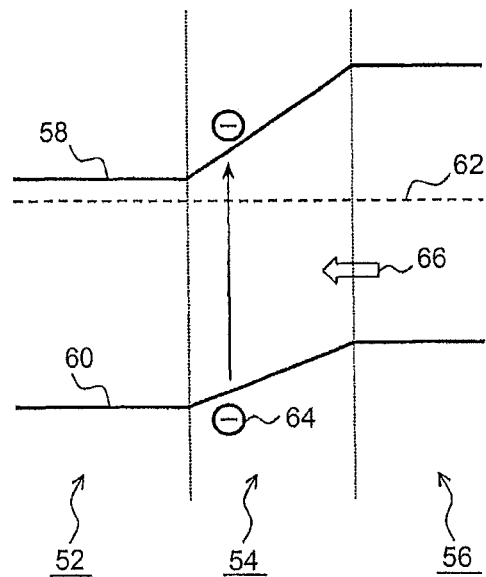
FIGS. 4(A) and 4(B) are band diagrams for explaining photoexcited structural change.
Figure 4B:
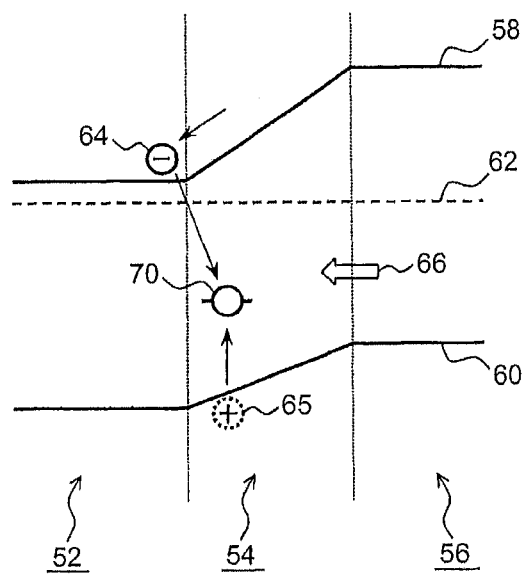

FIGS. 4(A) and 4(B) are band diagrams for explaining the phenomenon of forming a new energy level by photoexcited structural change of an ultraviolet-irradiated substance. First, to explain a basic principle, consideration will be given to a case in which a layer composed of tin oxide and magnesium oxide ($SnO_2$—MgO composite layer) is laminated on ITO.

FIG. 4(A) is a band diagram showing a structure composed of ITO 52, an intermediate crystalline layer 54, and an $SnO_2$—MgO composite layer 56. A Fermi level 62 exists between a conduction band 58 and a valence band 60. The Fermi level 62 of the ITO 52 is close to the conduction band 58, and the Fermi level 62 of the $SnO_2$—MgO composite layer 56 is intermediate between the conduction band 58 and the valence band 60. Upon irradiation with ultraviolet light 66, an electron 64 in the valence band 60 of the intermediate crystalline layer 54 is excited to the conduction band 58.

In an ultraviolet irradiation state shown in FIG. 4(B), the electron 64 in the valence band 60 in the region of the intermediate crystalline layer 54 is excited to the conduction band 58 by irradiation with the ultraviolet light 66, and the excited electron 64 is accommodated in the conduction band 58 of the ITO 52 due to the gradient of the conduction band 58. On the other hand, a hole 65 remains in the valence band 60 because the electron 64 has been extracted therefrom. In the intermediate crystalline layer 54, a time difference occurs between ultraviolet excitation and recombination, and this time difference causes atomic rearrangement. Accordingly, the hole 65 remaining in the valence band 60 of the intermediate crystalline layer 54 moves into a band gap, thus forming a new energy level 70.

Figure 5:
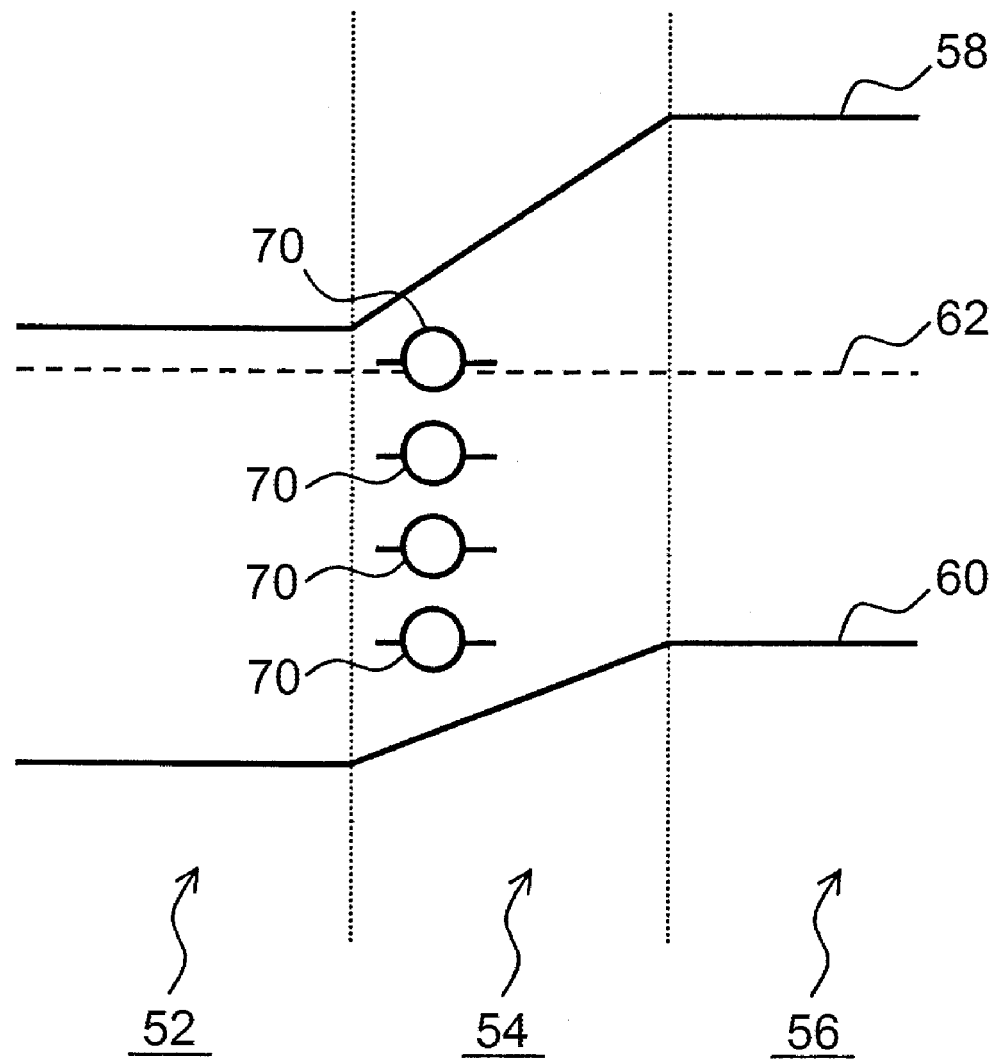
FIG. 5 is a band diagram for explaining new energy levels formed by photoexcited structural change.

FIG. 5 shows a state after recombination in which new energy levels are formed in the band gap of the intermediate crystalline layer 54 by ultraviolet irradiation. An increase of electron density in the band gap is observed only at the interface between the ITO 52 and the $SnO_2$—MgO composite layer 56, and a chemical shift of core electrons is also observed; therefore, it can be considered that the interatomic spacing has changed.

As described above, by irradiating the $SnO_2$—MgO composite layer 56 with ultraviolet light, the new energy level 70 can be formed in the band gap. The secondary cell utilizes the newly formed energy level 70, and it is necessary to form an insulating layer between the electrode and the n-type metal oxide semiconductor and control the electron.

The charging layer 18 shown in FIG. 1 is the n-type metal oxide semiconductor 26 made of titanium dioxide coated by the insulating coat 28 of silicone, as illustrated in FIGS. 1 and 2. In this case, a band diagram has a barrier by an insulating layer between titanium dioxide and ITO.

Figure 6A:
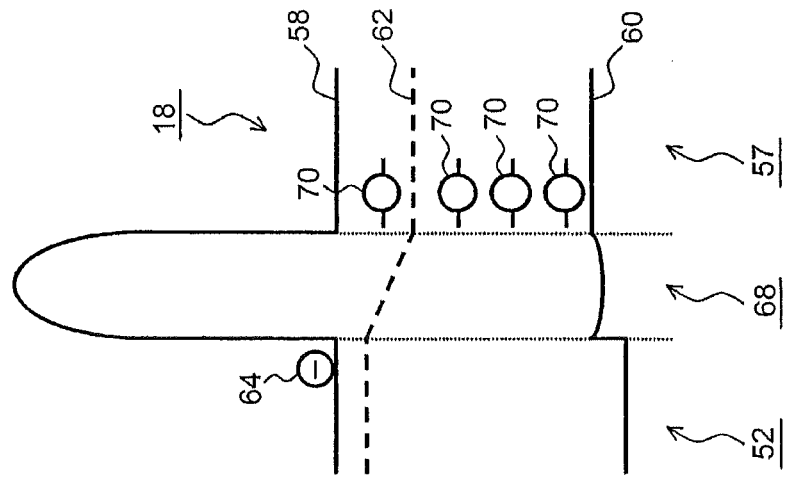
FIGS. 6(A) and 6(B) are band diagrams for explaining the charging/discharging function of the secondary cell according to the invention.
Figure 6B:
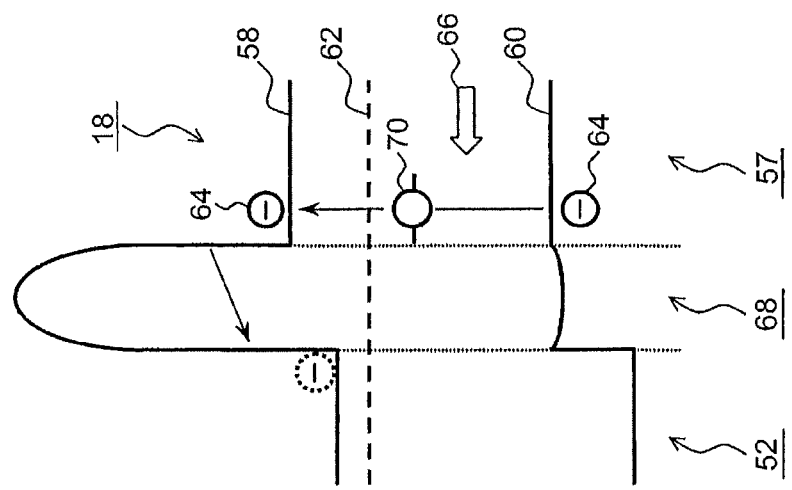

FIGS. 6(A) and 6(B) are band diagrams for explaining the state of forming a new energy level by photoexcited structural change in the presence of an insulating layer 68 between the ITO 52 and titanium dioxide 57. A barrier by the insulating layer 68 exists in the conduction band 58.

FIG. 6(A) shows irradiation with the ultraviolet light 66 in the presence of the insulating layer 68 between the titanium dioxide 57 and the ITO 52. When the titanium dioxide 57 coated by the insulating coat is irradiated with the ultraviolet light 66, the electron 64 in the valence band 60 of the titanium dioxide 57 is excited to the conduction band 58. In the vicinity of an interface with the ITO 52, the electron 64 passes through the insulating layer 68 with a certain probability and temporarily moves to the ITO 52. The photoexcited structural change of the titanium dioxide 57 occurs in the absence of the electron, resulting in a change in the interatomic distance at a site of the valence band 60 from which the electron 64 has been extracted. At this time, the energy level 70 moves into a band gap.

In FIG. 6(B), during irradiation with the ultraviolet light 66, the above phenomenon is repeated, and a number of energy levels 70 are formed in the band gap. However, electrons that should be captured at these energy levels 70 are excited by the ultraviolet light 66 and move to the ITO 52. The resulting electron-less energy levels 70 in the band gap remain even after the end of ultraviolet irradiation.

The role of the insulating layer 68 is to form a barrier between the ITO 52 and the titanium dioxide 57 and pass excited electrons 64 by the tunnel effect to form the electron-less energy levels 70 in the band gap. The electrons 64 that have moved to the ITO 52 stay due to charge potential around the insulating layer 68.

Figure 7:
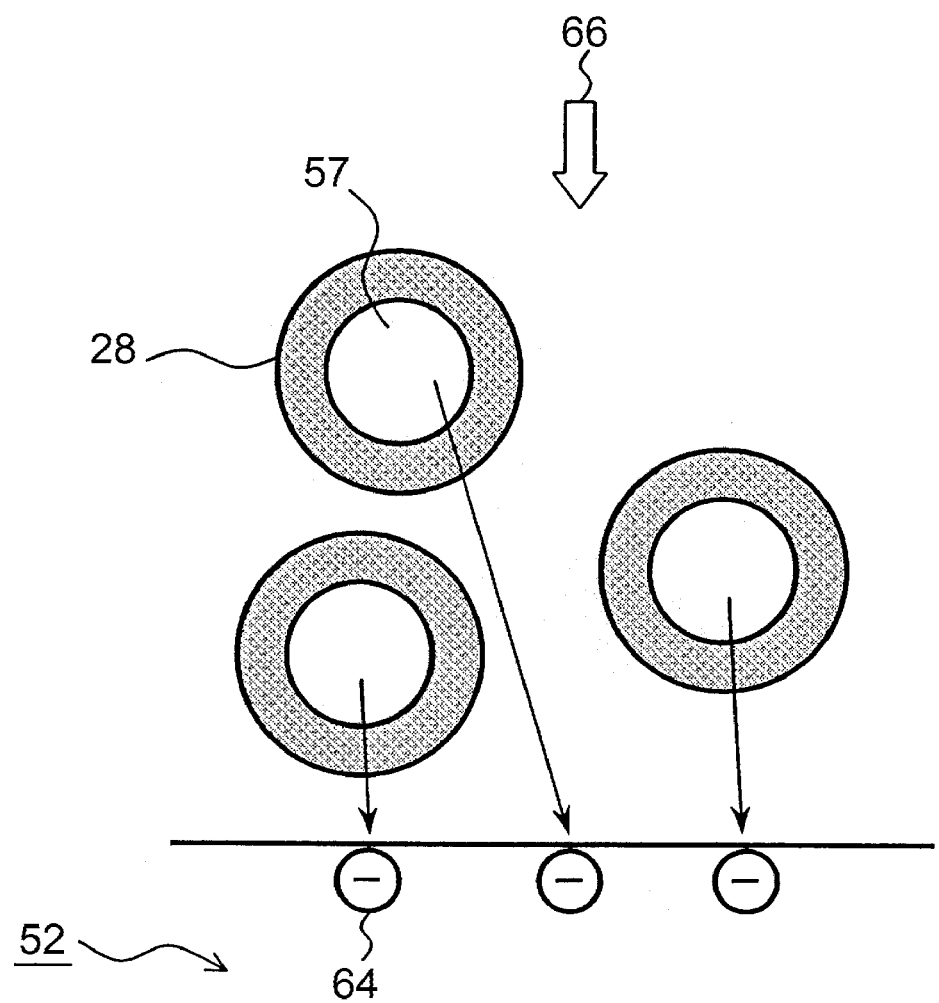
FIG. 7 is a diagram for explaining the movement of electrons by photoexcited structural change.

FIG. 7 is a diagram schematically showing a state in which electrons move to the ITO 52 by photoexcited structural change of the titanium dioxide 57 coated by the insulating coat 28 by ultraviolet irradiation. The electrons 64 pass through a barrier formed by the insulating coat 28 by tunneling and move to the ITO 52, and remain by weak capturing force caused by the potential of the insulating coat 28.

In the secondary cell, a blocking layer is formed by laminating the p-type metal oxide semiconductor layer 20 on the charging layer 18, and the second electrode 22 is provided. The principle of the secondary cell with such a structure will be described with reference to band diagrams of FIG. 8.

Figure 8A:
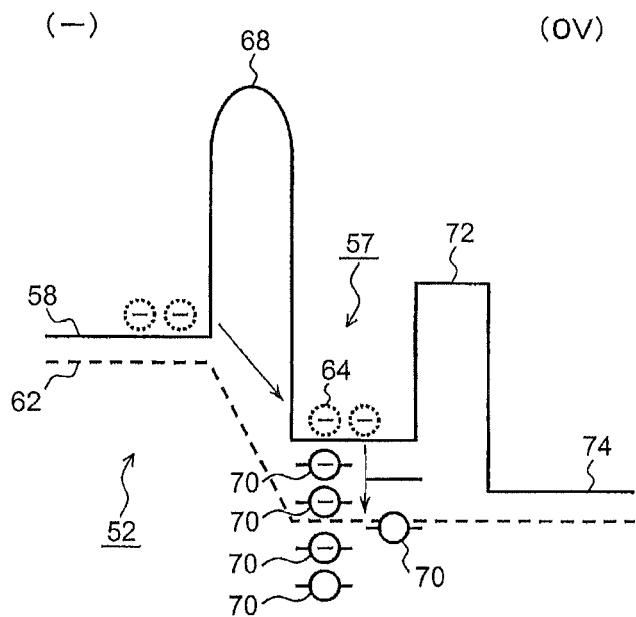
FIGS. 8(A) and 8(B) are band diagrams for explaining the charging/discharging function of the secondary cell according to the invention.

FIG. 8(A) is a band diagram of the secondary cell composed of the insulating layer 68 and the titanium dioxide 57 in the charging layer 18 and nickel oxide 72 functioning as the p-type metal oxide semiconductor 20 sandwiched between the ITO 52 forming the first electrode 14 and ITO 74 forming the second electrode 22, in which a minus voltage is applied to the ITO 52, and the ITO 74 is grounded at 0 V.

When a bias electric field (−) is applied to the titanium dioxide 57 having the energy levels 70 in the band gap, the electrons 64 of the ITO 52 pass (tunnel) through the barrier formed by the insulating layer 68 and move to the titanium dioxide 57. The electrons 64 that have moved are blocked from moving further to the ITO 74 by the nickel oxide 72, and are therefore captured at the energy levels 70 in the band gap of the titanium dioxide 57, so that energy is stored. This is a charge state in which the charging layer 18 is filled with electrons. This state is maintained even after the stop of the application of the bias electric field, and therefore functions as the secondary cell.

Figure 8B:
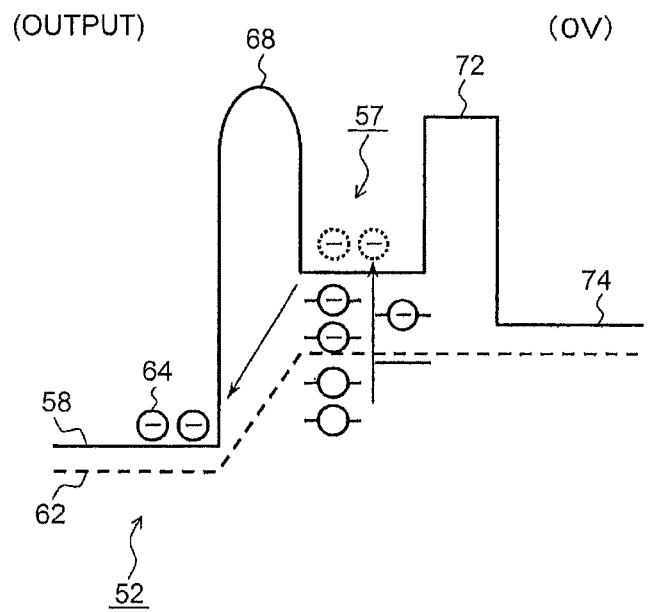

FIG. 8(B) is a band diagram in discharge to a load (not shown) connected between the ITO 52 and the ITO 74. The electrons 64 that have been captured in the band gap turn into free electrons in the conduction band 58. These free electrons move to the ITO 52 and flow to the load. This phenomenon is an energy output state or discharge state. This eventually brings about a state of no electron 64 in the energy levels 70 in the band gap, thus consuming all energy.

As described above, by externally applying the voltage to form the electric field, the energy levels formed in the band gap of the titanium dioxide are filled with electrons; by connecting the load between the electrodes, electrons are released for energy extraction, thus functioning as the cell. This phenomenon is repeated for use as the secondary cell. This is the principle of the basic secondary cell according to the invention.

Figure 9:
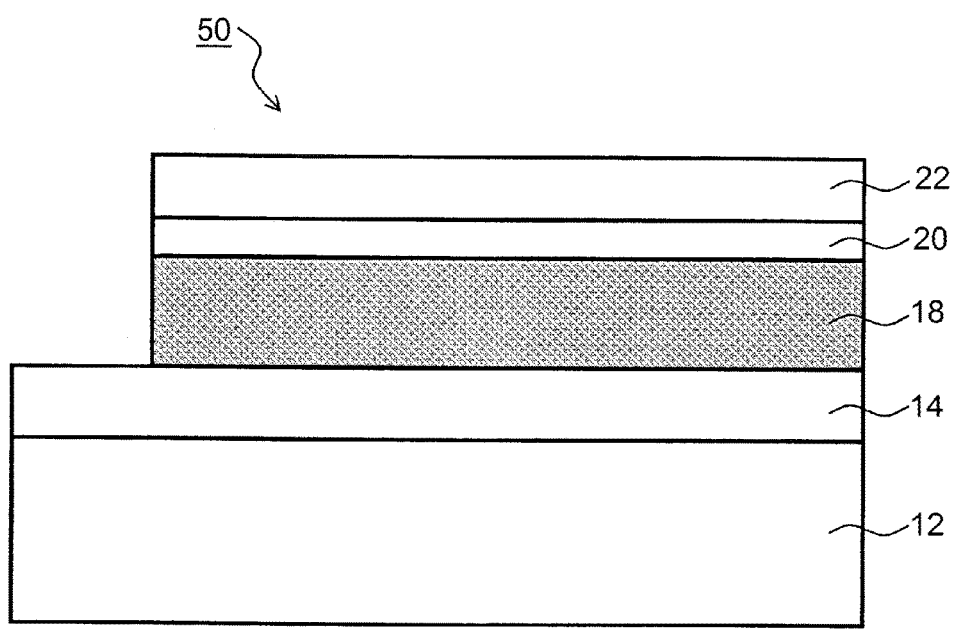
FIG. 9 is a diagram showing the basic configuration of the secondary cell according to the invention.

FIG. 9 shows the configuration of a basic secondary cell 50 according to the invention. In FIG. 9, the secondary cell 50 has a configuration in which the conductive first electrode 14 is formed on the substrate 12, and the charging layer 18 for charging energy, the p-type metal oxide semiconductor layer 20, and the second electrode 22 are laminated.

More specifically, ITO is laminated as the first electrode 14 on the glass substrate 12. Further, the charging layer 18 formed of titanium dioxide that is coated by the insulating coat and has undergone photoexcited structural change, the p-type metal oxide semiconductor layer 20 of nickel oxide, and the second electrode of ITO are laminated.

Figure 10A:
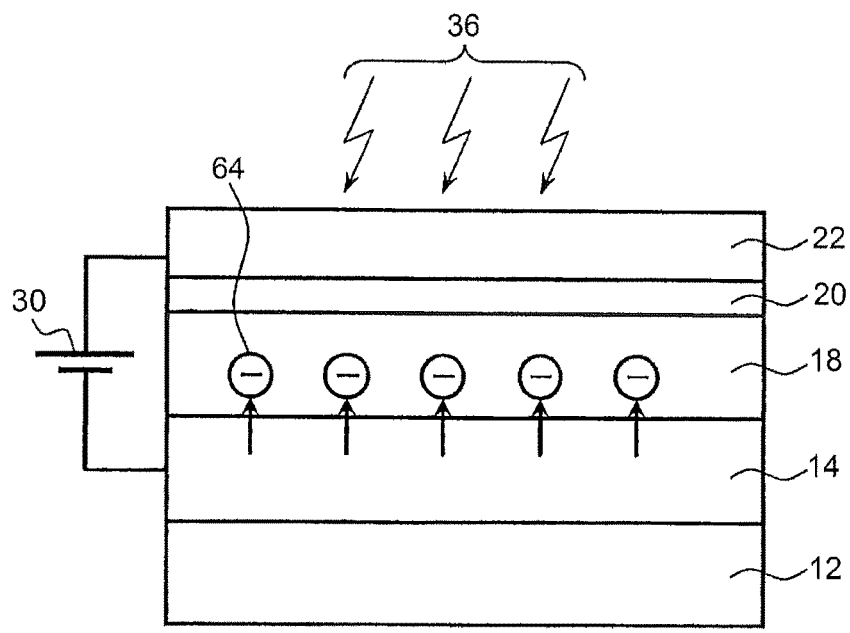
FIGS. 10(A) and 10(B) are diagrams for explaining the charge and discharge states of the secondary cell according to the invention.
Figure 10B:
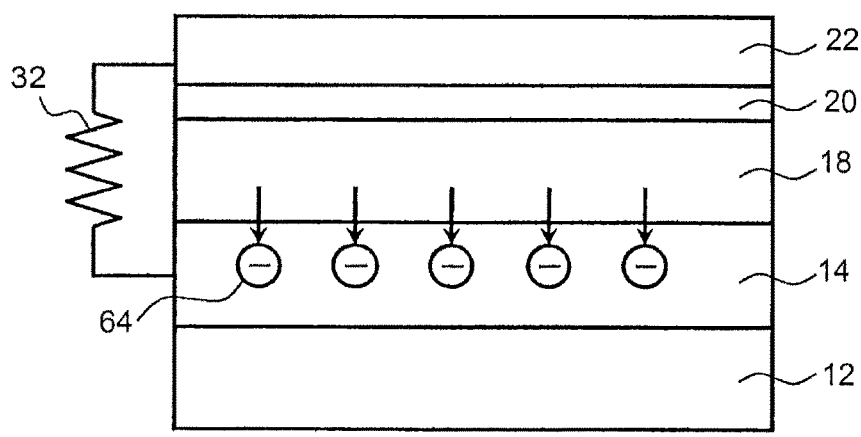

FIGS. 10(A) and 10(B) are diagrams for explaining a charge/discharge state of the above-described basic secondary cell according to the invention.

FIG. 10(A) shows a charge state. When an electric field is applied to the charging layer 18 with a power source 30 connected between the first electrode 14 and the second electrode 22, electrons are injected from the conduction band of the first electrode 14 into energy levels formed in the band gap of the titanium dioxide in the charging layer 18, so that energy is stored for charging. The p-type metal oxide semiconductor layer 20 prevents electrons from moving to the second electrode 22.

Further, in the structure of the secondary cell according to the invention, for example if the second electrode 22 is transparent like ITO, by applying sunlight 36 through the transparent second electrode 22 as shown in FIG. 10(A), electrons move into the charging layer 18. That is, the secondary cell 50 is charged. As a matter of course, if the substrate 12 and the first electrode are transparent, the sunlight 36 may be applied through the substrate 12.

The secondary cell basically has a structure in which a p-type semiconductor and an n-type semiconductor are sandwiched between electrodes. At this pn junction, a photovoltaic effect occurs, causing the potential of a direction that blocks electrons in an n-type region from moving to a p-type region and holes in the p-type region from moving to the n-type region. In this state, upon irradiation with light having energy above the band gap, electron-hole pairs (carriers) are formed. Electrons and holes reach the pn junction by diffusion. By the electric field of the pn junction, electrons and holes separate and move to the n-type region and the p-type region, respectively.

According to the invention, while the p-type metal oxide semiconductor and the n-type metal oxide semiconductor forms the pn junction, the n-type metal oxide semiconductor forms energy levels in the band gap by photoexcited structural change of titanium dioxide by ultraviolet light; accordingly, electrons are injected into energy levels by irradiation with light of energy below the band gap. The light irradiation in this process also produces the same effect as in the connection of the power source shown in FIG. 10(A); therefore, electrons move to the charging layer for charging. For the light irradiation, the electrode needs to be transparent. The ITO is a transparent electrode material suitable for light charging.

FIG. 10(B) is a diagram for explaining a discharge state. When a load 32 is connected between the first electrode 14 and the second electrode 22, electrons that have been injected in the charging layer 18 move to the first electrode 14, which brings about a current flow through the load 32, that is, a discharge state. When energy is consumed by discharge, the cell is recharged for use.

Figure 11:
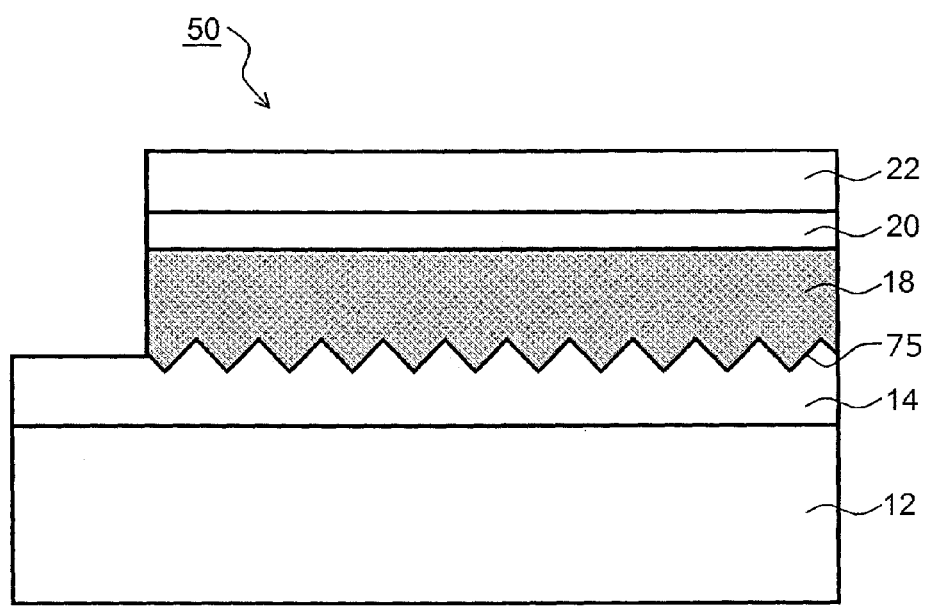
FIG. 11 is a diagram of the secondary cell having a first electrode of a TEXTURE type where pyramid-shaped asperities are formed.

FIG. 11 shows a structure in which fine pyramids are formed on a surface of the first electrode of a TEXTURE type. The pyramid-shaped asperities improve the adhesion of a TEXTURE-type structure surface 75 of the first electrode 14 surface to the charging layer 18. In irradiation with sunlight, it is possible to efficiently absorb incident light and reduce the loss of light energy.

Thus, the secondary cell according to the invention is capable of being charged also by light such as sunlight. The charging function is performed by electron injection into energy levels formed in the band gap instead of electron movement above the band gap, which enables charging with low light energy.

According to the secondary cell of the invention, in the charging layer, the titanium dioxide is coated by the insulating coat, and the conduction band has the barrier. This barrier function can be reinforced by forming a thin layer of titanium dioxide by sputtering between the first electrode and the charging layer, which is the structure of the secondary cell shown in FIG. 1.

While the titanium dioxide of the charging layer is coated by the silicone insulating coat, a uniform coating is not always formed, which leads to variation. In an extreme case, a coating is not formed, so that the titanium dioxide might directly contact the electrode. In such a case, electrons are injected into titanium oxide by recombination, so that energy levels are not formed in the band gap, which reduces the charging capacity. Therefore, to suppress the reduction of the charging capacity for a higher-performance secondary cell, the thin layer of titanium dioxide is formed between the first electrode and the charging layer, as shown in FIG. 1.

The thin layer of titanium dioxide functions as the insulating layer, with little variation in device characteristics, which effectively improves stability and yield on a production line.

While the embodiment of the invention has been described, the invention includes appropriate modifications without impairing its objects and advantages, and is also not restricted by the above embodiment.

The effects of the present invention are as follows.

According to the secondary cell of the invention, in the charging layer structure, a new energy level is formed in the band gap of the n-type metal oxide semiconductor by a technology utilizing photoexcited structural change of a metal oxide, which enables charging with low energy and achieves a large-capacity secondary cell. Further, the secondary cell according to the invention has an inorganic solid structure not using an electrolyte, which enables stable operation and long life at low cost due to simple production.

Further, the inorganic solid structure not using an electrolyte can reduce charging time, which enables quick charging. Also, it enables charging by light, which enables charging into the charging layer without a charging power source.

The invention claimed is:

1. A secondary cell having an inorganic solid structure without an electrolyte, comprising:
    a substrate;
    a conductive first electrode;
    a charging layer having
        particles of a first n-type metal oxide semiconductor having energy levels in a band gap of the first n-type metal oxide semiconductor able to capture electrons at the energy levels, and having undergone photoexcited structural change by ultraviolet irradiation to obtain the energy levels, and
        an insulating substance coated on the particles of the first n-type metal oxide semiconductor;
    a p-type semiconductor layer; and
    a conductive second electrode,
    the substrate, the first electrode, the charging layer, the p-type semiconductor layer, and the second electrode being laminated, and
    the charging layer being chargeable by connecting a power source between the first electrode and the second electrode.

2. The secondary cell according to claim 1, wherein a layer of a second n-type metal oxide semiconductor is provided between the first electrode and the charging layer.

3. The secondary cell according to claim 1, wherein the first electrode and the second electrode are metal electrodes.

4. The secondary cell according to claim 1, wherein the substrate is made of a conductive material.

5. The secondary cell according to claim 1, wherein the first n-type metal oxide semiconductor is titanium dioxide.

6. The secondary cell according to claim 1, wherein the p-type semiconductor is nickel oxide or copper aluminum oxide.

7. The secondary cell according to claim 1, wherein the first n-type metal oxide semiconductor in the charging layer is one of tin oxide, titanium dioxide, and zinc oxide or a composite thereof.

8. The secondary cell according to claim 1, wherein the insulating substance coating the first n-type metal oxide semiconductor is insulating resin or an inorganic insulator.

9. The secondary cell according to claim 1, wherein the charging layer is produced by a production process comprising:
    dissolving an organic metal salt obtained by binding organic matter to an element of the first n-type metal oxide semiconductor and an insulator in an organic solvent and applying it on the first electrode provided on the substrate or on a layer of a second n-type metal oxide semiconductor in a case where the layer of the second n-type metal oxide semiconductor is provided on the first electrode,
    drying and firing after the applying, and
    performing ultraviolet irradiation to obtain the photoexcited structural change after firing a layer of the metal salt of the first n-type metal oxide semiconductor coated by the insulating substance.

10. The secondary cell according to claim 1, wherein the substrate is a resin sheet.

11. The secondary cell according to claim 1, wherein a surface of the first electrode is textured.

12. The secondary cell according to claim 2, wherein the first electrode and the second electrode are metal electrodes.

13. The secondary cell according to claim 2, wherein the first n-type metal oxide semiconductor is titanium dioxide.

14. The secondary cell according to claim 2, wherein the p-type semiconductor is nickel oxide or copper aluminum oxide.

15. The secondary cell according to claim 2, wherein the first n-type metal oxide semiconductor in the charging layer is one of tin oxide, titanium dioxide, and zinc oxide or a composite thereof.

16. The secondary cell according to claim 2, wherein the insulating substance coating the first n-type metal oxide semiconductor is insulating resin or an inorganic insulator.

17. The secondary cell according to claim 2, wherein the charging layer is produced by a production process comprising:
    dissolving an organic metal salt obtained by binding organic matter to an element of the first n-type metal oxide semiconductor and an insulator in an organic solvent and applying it on the first electrode provided on the substrate or on the layer of the second n-type metal oxide semiconductor in a case where the layer of the second n-type metal oxide semiconductor is provided on the first electrode,
    drying and firing after the applying, and
    performing ultraviolet irradiation to obtain the photoexcited structural change after firing a layer of the metal salt of the first n-type metal oxide semiconductor coated by the insulating substance.

18. The secondary cell according to claim 2, wherein the substrate is a resin sheet.

19. The secondary cell according to claim 2, wherein a surface of the first electrode is textured.

20. A charging arrangement comprising:
    the secondary cell of claim 1; and
    a power source connected between the first electrode and the second electrode and charging the secondary cell.

* * * * *